(12) United States Patent
Parrott et al.

(10) Patent No.: US 6,709,019 B2
(45) Date of Patent: Mar. 23, 2004

(54) QUICK CONNECTOR WITH AUTOMATIC RELEASE

(75) Inventors: David G. Parrott, Escondido, CA (US); Don V. Hitzfield, Mission Viejo, CA (US); Steve O. Montgomery, San Diego, CA (US)

(73) Assignee: Apical Industries, Inc., Oceanside, CA (US)

( * ) Notice: Subject to any disclaimer, the term of this patent is extended or adjusted under 35 U.S.C. 154(b) by 32 days.

(21) Appl. No.: 09/961,680

(22) Filed: Sep. 21, 2001

(65) Prior Publication Data

US 2003/0057698 A1 Mar. 27, 2003

(51) Int. Cl.[7] ............................................... F16L 37/10
(52) U.S. Cl. ............................ 285/1; 285/316; 285/920
(58) Field of Search ............................ 285/316, 1, 920

(56) References Cited

U.S. PATENT DOCUMENTS

| | | | | |
|---|---|---|---|---|
| 415,273 A | * | 11/1889 | Houston | 285/1 |
| 3,100,655 A | * | 8/1963 | Work | 285/33 |
| 3,430,184 A | * | 2/1969 | Acord | 439/255 |
| 3,509,515 A | * | 4/1970 | Acord | 439/258 |
| 4,134,634 A | * | 1/1979 | Baur et al. | 439/352 |
| 4,166,664 A | * | 9/1979 | Herrmann, Jr. | 439/258 |
| 4,392,513 A | * | 7/1983 | Parrish | 137/614.01 |
| 4,485,845 A | * | 12/1984 | Brady | 137/614.04 |
| 4,521,064 A | * | 6/1985 | Knapp et al. | 439/153 |
| 4,605,271 A | * | 8/1986 | Burns | 439/160 |
| 4,645,282 A | * | 2/1987 | Frear | 439/160 |
| 4,691,941 A | * | 9/1987 | Rabushka et al. | 285/1 |
| 4,723,929 A | * | 2/1988 | Parish | 441/39 |
| 6,131,961 A | | 10/2000 | Heilmann | 285/316 |

* cited by examiner

*Primary Examiner*—Eric K. Nicholson
(74) *Attorney, Agent, or Firm*—Luce, Forward, Hamilton & Scripps

(57) ABSTRACT

A quick connector including a first connecting member attached to an object, a second connecting member releasably attached to the first connecting member and a release mechanism for detaching the first and second connecting members, wherein the release mechanism automatically disconnects the first connecting member from the second connecting members when the connecting members are pulled away from the object.

17 Claims, 2 Drawing Sheets

QUICK CONNECTOR WITH AUTOMATIC RELEASE

FIELD OF THE INVENTION

The present invention relates generally to conduit couplings through which gas or fluid flows and specifically to a quick connector having an automatic release mechanism.

BACKGROUND OF THE INVENTION

Quick connectors primarily serve to create a rapid connection between a first connector (sleeve) and a second connector (plug), which can be disconnected rapidly in a similar manner. Typically, these connectors serve as conduit couplings through which gas or fluid flows. Most quick connectors have a release mechanism for detachment of the sleeve and plug by hand, without the use of tools. However, there are certain instances that require automatic disengagement of a quick connection without manual assistance.

For example, accidents on the water involving aircraft and boats often require an undamaged watercraft for the survival of the accident victims. Therefore, inflatable rafts are often carried on board planes, helicopters and boats. Conventionally, these rafts inflate through an air hose with a manual connector, which must be disconnected by hand after inflation. One drawback with using a manual connector during an emergency is that the survivors may not be trained to detach the connector. Further, even if some survivors are trained how to detach the connector, humans often panic during moments of high stress, causing them to forget simple emergency procedures. Therefore, there exists a need for a quick connector, which automatically disengages upon the occurrence of a certain condition during an emergency.

SUMMARY OF THE INVENTION

One aspect of the present involves a quick connector including a first connecting member attached to an object, a second connecting member releasably attached to the first connecting member and a release mechanism for detaching the first and second connecting members, wherein the release mechanism automatically detaches the first and second connecting members when the connecting members are pulled away from the object.

Another aspect of the present invention involves a quick connector having an automatic release mechanism including a biased shell member for detaching first and second connecting members when the shell member is pulled away from the second connecting member. The automatic release mechanism further includes a lanyard attached to the outer periphery of the hollow shell member at one end and attached to an object at another end such that when the first and second connecting members are moved away from the object, the lanyard becomes taut, pulls the shell member away from the second connecting member and automatically releases or disconnects the first connecting member from the second connecting member.

A further aspect of the present invention involves a quick connector having an automatic release mechanism including a biased shell member and a lanyard, wherein the lanyard is attached, at a first end, to the hollow shell member using a fastener chosen from the group including: harnesses, buckles, O-rings, snap hooks and clips. In addition, the lanyard is attached, at a second end, to an object using a fastener chosen from the group including: harnesses, buckles, O-rings, snap hooks and clips.

DETAILED DESCRIPTION OF THE PREFERRED EMBODIMENTS

Figure 1:
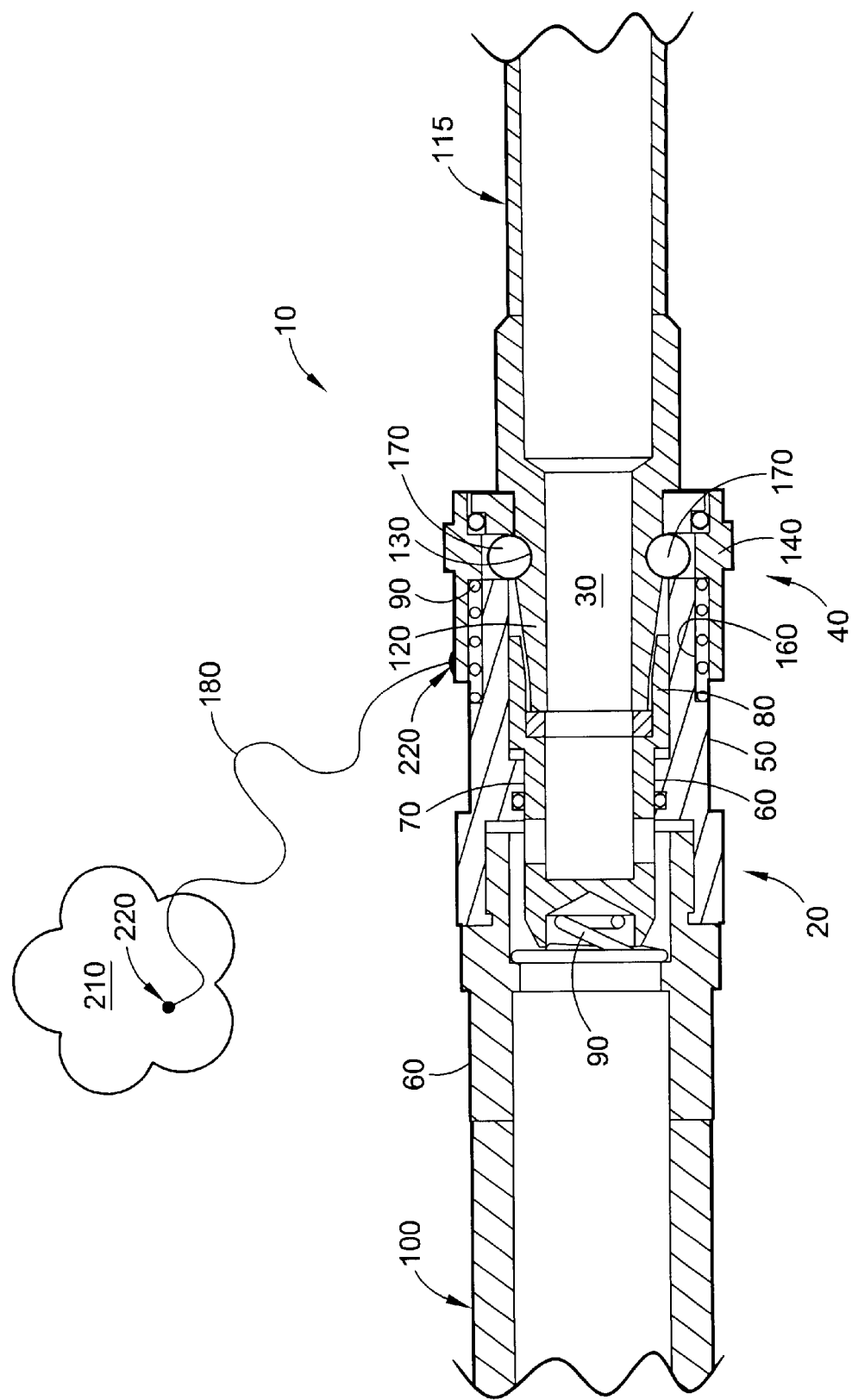
FIG. 1 is sectional view of a quick connector according to the present invention including attached first and second connecting members and an automatic release mechanism.
Figure 2:
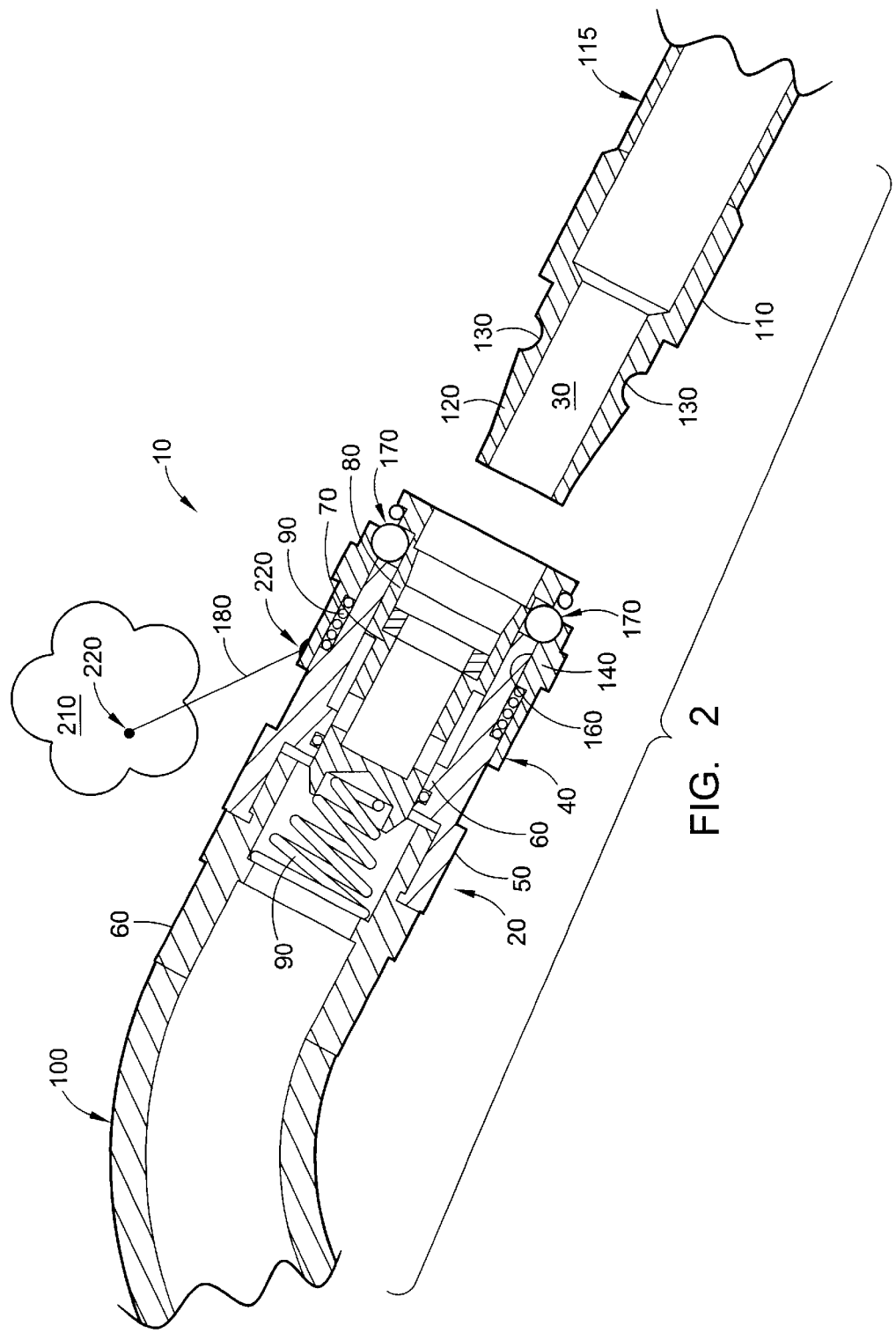
FIG. 2 is another sectional view of a quick connector according to the present invention including detached first and second connecting members and an automatic release mechanism.

Referring to FIGS. 1 and 2, an automatically releasable quick connector 10 in accordance with the present invention is generally comprised of a first connecting member 20, a second connecting member 30 and an automatic release mechanism 40. As best seen in FIG. 1, the first connecting member 20 includes a coupling end 50, a rear end 60, a movable guide member 70, a receptacle 80 and a spring 90. The first connecting member 20 is attached to a first hose 100 at its rear end 60 and to the second connecting member 30 at its coupling end 50.

The second connecting member 30 includes a coupling end 120 and a rear end 110 attached to a second hose 115. The coupling end 120 is inserted into the receptacle 90 of the movable guide member 70 such that the spring 100 biases the second connecting member 30 away from the first connecting member 20. The second connecting member 30 further includes an annular groove 130 around its periphery adapted for engaging with the automatic release mechanism 40.

The automatic release mechanism 40 includes a hollow shell member 140, a spring 150, an inner flange 160, a plurality of steel balls 170 and a lanyard 180. The lanyard 180 has a first end attached to the hollow shell member 140 and a second end attached to an object 210. The lanyard 180 is attached to the hollow shell member 140 and to the object 210 using fasteners 220. Suitable fasteners include, but are not limited to, harnesses, buckles, O-rings, snap hooks and clips. The lanyard 180 is preferably made from a strong, durable material such as polypropylene, synthetic elastomers, microfibers or cotton.

As best seen in FIG. 1, when the connecting members 20,30 are attached, the shell member 140 is biased toward the coupling end 50 of first connecting member 20 by spring 150, causing the inner flange 160 to force the steel balls 170 inwards, and therefore the steel balls 170 are forced to project into the annular groove 130. As long as the connecting members 20,30 remain close to the object 210, the lanyard 180 will remain slack. However, as best seen in FIG. 2, when the connecting members 20,30 are pulled away from the object 210, the lanyard 180 becomes taut and the hollow shell member 140 is pulled backwards against spring 150. This causes the steel balls 170 to be released from the constraint of the inner flange 160 of the shell member 140, which triggers the biased spring 90 and ejects the second connecting member 30.

The following is an example used to help clarify the above disclosure. Accidents on the water frequently require an undamaged watercraft for the accident victims. For this reason, inflatable emergency life rafts are often carried aboard planes, helicopters and boats. For the purposes of this example, assume that the object 210 is an abandoned helicopter 210, that hose 100 is connected to a canister of compressed air within helicopter 210, that hose 115 is connected to an inflatable emergency life raft 115, and that the air hoses 100,115 are connected, via the automatically releasable quick connector 10.

After an accident, the accident survivors inflate the life raft and climb aboard. Normally, it would be necessary to manually disengage the hoses after inflation. However, manual disconnection may be a problem since the accident survivors may lack training or may be panicked. By employing the automatically releasable quick connector 10 of the present invention, these potential problems can be avoided. As the life raft is steered away from the wreckage, the air hose 115 is pulled away from the helicopter 210 causing the lanyard 180 to become taut and disconnecting the air hoses 100,115. As explained above, pulling the lanyard 180 causes a chain reaction resulting in the automatic disconnection of the quick connector 10, and therefore, the automatic disconnection of the air hoses 100,115.

Many variations of the above-described invention are possible. Such variations are not to be regarded as a departure from the spirit and scope of the invention, but rather as subject matter intended to be encompassed within the scope of the following claims, to the fullest extent allowed by applicable law.

What is claimed is:

1. A quick connector in combination with an aircraft comprising:
   a first air hose connector attached to the aircraft;
   a second air hose connector releasably attached to the first air hose connector; and
   a release mechanism for detaching the first and second air hose connectors;
   wherein the release mechanism automatically releases the first air hose connector from the second air hose connector when the air hose connectors are pulled in a direction away from the aircraft.

2. The quick connector of claim 1, wherein the release mechanism includes a hollow shell member that is biased toward the second air hose connector.

3. The quick connector of claim 2, wherein the release mechanism automatically detaches the first air hose connector from the second air hose connector when the shell member is pulled away from the second air hose connector.

4. The quick connector of claim 3, wherein the release mechanism further includes a lanyard attached, at a first end, to the outer periphery of the hollow shell member.

5. The quick connector of claim 4, wherein the lanyard includes a second end attached to the aircraft.

6. The quick connector of claim 5, wherein, when the first and second air hose connectors are moved away from the aircraft, the lanyard becomes taut, pulls the shell member away from the second air hose connector and automatically detaches the first and second air hose connectors.

7. The quick connector of claim 4, wherein the lanyard is attached to the hollow shell member using a fastener.

8. The quick connector of claim 5, wherein the lanyard is attached to the aircraft using a fastener.

9. A quick connector comprising:
   a first connecting member attached to a first air hose which is coupled to a canister of gas on a helicopter;
   a second connecting member releasably connected to the first connecting member and attached to a second air hose which is coupled to an inflatable object; and
   a release mechanism for automatically disconnecting the first connecting member from the second connecting member.

10. The quick connector of claim 9, wherein the release mechanism automatically disconnects the first connecting member from the second connecting member when the inflatable object is moved away from the gas canister.

11. The quick connector of claim 9, wherein the release mechanism includes a hollow shell member that is biased toward the second connecting member.

12. The quick connector of claim 11, wherein the release mechanism automatically detaches the first and second air hoses when the shell member is pulled away from the second connecting member.

13. The quick connector of claim 12, wherein the release mechanism further includes a lanyard attached, at a first end, to the outer periphery of the hollow shell member.

14. The quick connector of claim 13, wherein the lanyard has a second end connectable to the helicopter.

15. The quick connector of claim 14, wherein, when the inflatable object is moved away from the helicopter, the lanyard becomes taut, pulls the shell member away from the second connecting member and automatically disconnects the first connecting member from the second connecting member.

16. The quick connector of claim 13, wherein the lanyard is attached to the hollow shell member using a fastener.

17. The quick connector of claim 14, wherein the lanyard is attached to the helicopter using a fastener.

* * * * *